PTU07 XR 4,282,520

United States Patent [19]

Shipp et al.

[11] 4,282,520

[45] Aug. 4, 1981

[54] PIEZOELECTRIC HORN AND A SMOKE DETECTOR CONTAINING SAME

[76] Inventors: John I. Shipp; Charlie C. Rogers, III, both of 212 N. Jackson, Tullahoma, Tenn. 37388

[21] Appl. No.: 954,475

[22] Filed: Oct. 25, 1978

[51] Int. Cl.[3] ........................ G08B 17/10; G08B 3/00; G01T 1/18

[52] U.S. Cl. ................................ 340/629; 340/384 E; 250/381

[58] Field of Search ................... 340/629, 384 E, 627; 250/381, 385, 384

[56] References Cited

U.S. PATENT DOCUMENTS

| | | | |
|---|---|---|---|
| 3,879,726 | 4/1975 | Sweany | 340/384 E |
| 3,953,844 | 4/1976 | Barr et al. | 340/627 |
| 4,035,788 | 7/1977 | Barr | 340/629 |
| 4,081,684 | 3/1978 | Wieder | 340/629 |
| 4,096,473 | 6/1978 | Sweany et al. | 340/629 |

FOREIGN PATENT DOCUMENTS

| | | | |
|---|---|---|---|
| 2413162 | 10/1974 | Fed. Rep. of Germany | 340/629 |

*Primary Examiner*—Thomas A. Robinson

*Attorney, Agent, or Firm*—Fidelman, Wolffe & Waldron

[57] ABSTRACT

An ionization smoke detector having two ionization chambers, one completely open to the ambient atmosphere and the other, a reference chamber, in communication with the atmosphere only through a breather tube having a defined length to diameter ratio. The detector employs a piezoelectric horn mounted on a cylindrical tube-like structure and attached to a printed circuit board containing one or more holes opposite the horn element so as to form a resonant chamber. The invention further contemplates a test switch which can be used to determine whether the battery is charged and the circuits are functioning.

14 Claims, 16 Drawing Figures

PIEZOELECTRIC HORN AND A SMOKE DETECTOR CONTAINING SAME

This application relates to an improved device for detecting smoke comprising a radiation source, two ionization chambers, a power source, a detection circuit and an alarm circuit which triggers a piezoelectric horn when a predetermined level of smoke is exceeded. More particularly, the detector utilizes a partially closed ionization chamber to obtain a reference or control ion current and a completely open ionization chamber to measure deviations from this control ion current in response to the presence of smoke.

BACKGROUND OF THE INVENTION

Conventional smoke detectors have particular disadvantages owing to the lack of reliability, expense and high current requirements of the electromechanical alarm horns currently used. These electromechanical horns have relatively high current demands for starting the alarm (about 300 milliamperes, ma) and sustaining operation at steady state (about 70 ma), which for direct current smoke detectors requires the use of expensive alkaline or mercury batteries for reasonable battery life. Accordingly, there is a need for a reliable horn with low current demands so that cheaper zinc/carbon or zinc chloride batteries may be used.

The realiability and low current demands of piezoelectric horns are well known in the prior art. However, such horns were limited, prior to this invention, to low audio output applications such as video games and electronic pinball machines. Such horns could not be used to meet the Underwriters Laboratories alarm requirement of 85 decibels (db) at 10 feet from the smoke detector without use of prohibitively high drive voltages and currents.

The use of detectors having two ionization chambers is also known. Generally, one chamber is almost completely closed to the atmosphere and is used to obtain a reference current for comparison to the current detected in the test chamber which is freely open to the surrounding air. When the two currents differ by more than a predetermined amount the alarm is triggered. In the past, problems have been encountered when these detectors were exposed to changes in humidity or pressure causing changes in the current measured in the test chamber but not in the current measured in the reference chamber. The difference in these currents often led to activation of the alarm when no smoke was present.

Smoke detectors are normally mounted on room ceilings so as to contact smoke where it first accumulates in the room. It is desirable to periodically test the detector to assure that the battery is sufficiently charged and circuits are operating, but this is difficult where the detector is attached to the ceiling and out of reach. Existing devices have small buttons or levers for activating the tester circuit which make testing even more inconvenient when the detector is out of reach.

OBJECTS OF THE INVENTION

The present invention involves a smoke detector which solves many of the problems encountered with devices of the prior art. Accordingly, it is an object of this invention to provide a reliable horn with low current demands to be utilized in a conventional smoke detector. More particularly, it is an object of this invention to provide a piezoelectric horn with higher audio output for lower power input (i.e., higher audio efficiency) than can be obtained with piezoelectric horns known in the art. It is a further object of the invention to provide a horn having low current demands for high audio output for use in any alternating or direct current application, including automatic buzzers, fire alarms, security devices, or the like.

It is another object of the present invention to provide a dual chamber ionization detector wherein the reference chamber is capable of responding to rapid changes in pressure and humidity while not being influenced by smoke in the surrounding atmosphere.

It is still another object of this invention to provide a convenient and simple circuit test to be used to determine whether the battery is charged and the circuits are functioning.

Other objects and advantages of the present invention may be understood by reference to the following description taken in conjunction with the accompanying drawings in which.

DETAILED DESCRIPTION

Figure 1:
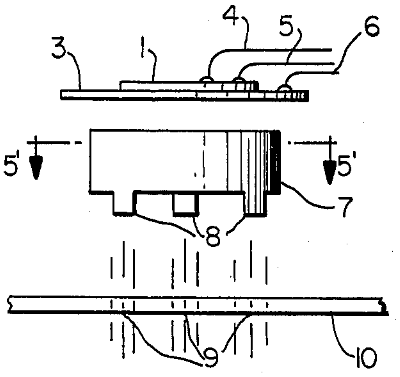
FIG. 1 is a side elevation view of the horn assembly of the present invention.

Basically, the smoke detector of the invention comprises two ionization chambers, two radiation sources, a voltage comparator circuit, a horn driver circuit, a piezoelectric horn, a battery and a low voltage battery detection circuit with a test switch.

PIEZOELECTRIC HORN

Referring to FIGS. 1–9, the horn of the invention utilizes a tone transducer (FIG. 9) comprising two areas of piezo ceramic 1 and 2 bonded to a brass disk 3 and having three wires, wire 4 leading to the oscillator ceramic 1, wire 5 leading to the feeback ceramic 2 and wire 6 leading to the brass disk 3. Circuitry details are discussed in the Horn Driver Circuit section.

The bonding of the disk 3 to the horn ring 7 is accomplished by the use of a bonding agent in sufficient quantity to form a firm mechanical connection without unduly constraining the bending of the disk. This can be accomplished by the use of any suitable bonding agent, such as a silicone rubber, an epoxy resin, or any room temperature vulcanizable (RTV) material, applied sparingly to the knife edge 19.

As shown in FIG. 1, the tone transducer is mounted on the horn ring 7 having mounting feet 8 to enable attachment to a printed circuit board 10 or other suitable structure by soldering or twisting the feet 8 after insertion through mounting holes 9. The horn ring 7 may be made of any suitable metal, such as brass, steel, or aluminum, or any suitable impact plastic, such as Cyclolac ABS (acrylonitrile-butadiene-styrene, available from Borg-Warner Corporation, Parksburg, W. Va.).

Figure 2:
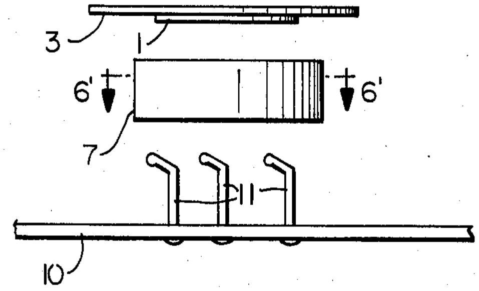
FIG. 2 is a side elevation view of a second embodiment of the horn assembly of the invention.

FIG. 2 illustrates an alternative embodiment to the horn of FIG. 1. In this embodiment the tone transducer is inverted with respect to that of FIG. 1 such that the ceramic areas 1 and 2 face the printed circuit board 10. Three spring contacts 11 are provided to make the electrical connections in place of the wires 4, 5, and 6 of the horn of FIG. 1.

In the assemblies of both FIGS. 1 and 2 the tone transducer is bonded to the horn ring 7 which in turn is mounted on the printed circuit board 10 by means of the feet 8 or an adhesive as in the case of FIG. 2.

Figure 16:
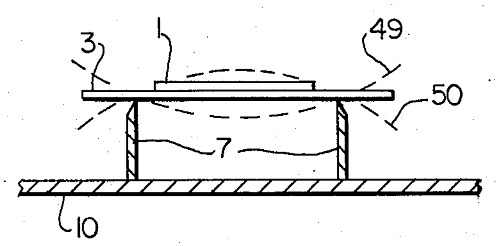
FIG. 16 is a cross-sectional view of the tone transducer used in the invention.

For maximum audio efficiency the tone transducer is mounted to the horn ring at the nodal circle of the transducer. A voltage applied to the transducer produces a bending of the disk 3 such that one circle on the disk remains motionless. This circle is defined as the nodal circle, two points of which are shown in FIG. 16 at the intersection of curves 49 and 50 which represent the deflection of the transducer under an applied voltage. Because of the criticality of locating the ring at this nodal circle, a preferred embodiment of the horn ring 7 has a knife edge 19 (see FIG. 8). The knife edge allows minimum physical contact between the transducer and the ring and thus minimizes motion constraint which causes audio dampening. Additionally, the knife edge allows more accurate centering of the transducer on the ring which again minimizes bending constraint.

To optimize audio efficiency the design of the mounting for the horn ring 7 onto the tone transducer and the printed circuit (pc) board 10 is critical. The air column between the transducer and pc board comprises a resonant activity for the transducer. Air column movements owing to deflections of the transducer are transmitted through a resonant hole 12 in the pc board 10 (FIG. 6) to produce an audible tone the frequency of which is governed by the transducer vibration frequency. The amplitude of the tone is a function of the air column volume and the size of the resonance hole 12. Maximum audio efficiency can be obtained by empirically determining the height of the ring 7 and the size of the hole 12 by varying these geometries and observing minimum current required to drive the transducer which corresponds to maximum audio output. These geometries can also be determined theoretically from standard resonant cavity calculations.

Figure 3:
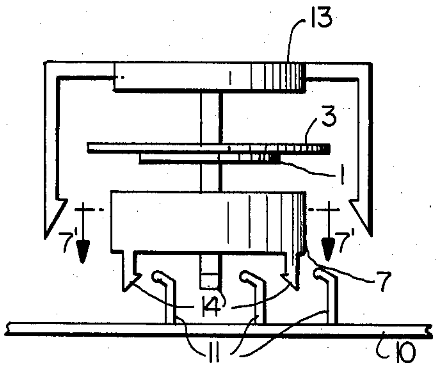
FIG. 3 is a side elevation view of a third embodiment of the horn assembly of the invention.

FIG. 3 presents a third embodiment for the horn of the invention. Rather than use of a bonding agent for mounting the transducer and/or horn ring described above, the embodiment of FIG. 3 illustrates a mounting technique which holds the transducer in place owing to clamping pressure of horn clamp 13. This clamp and the alternative horn ring 7 shown in FIG. 3 may be made of any suitable impact plastic or metal including those described for horn ring 7 above. Using spring contacts 11 in much the same fashion as for the embodiment of FIG. 2 or wire contacts as in FIG. 1, the tone transducer is mounted by snapping the legs 14 of the horn ring 7 and the legs of horn clamp 13 into the printed circuit board 10 thus clamping tone transducer firmly against the horn ring 7 and the horn clamp 13. Slots 16 and 9 are provided in the printed circuit board 10 to receive the snaps of the horn ring feet 14 and the horn clamp 13.

Figure 4:
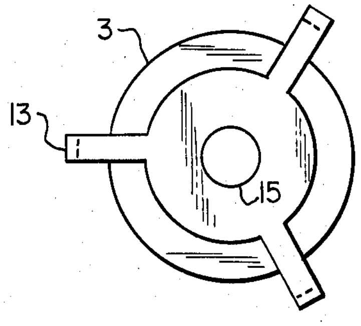
FIG. 4 is a top plan view of the horn assembly of FIG. 3.

A top view of the horn clamp 13 is presented in FIG. 4. Resonant hole 15 as shwon in FIG. 4 may be added to facilitate resonant turning. An additional horn embodiment comprises a transducer having two resonant cavities, one above and one below the transducer disk.

Figure 5:
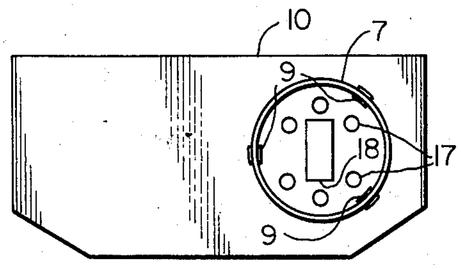
FIG. 5 is a cross-sectional view of the assembled horn of FIG. 1 taken along the section line 5'—5'.

FIG. 5 illustrates an alternative embodiment to the single resonant hole 12 of the horn of FIG. 2, namely a pattern of six resonance holes 17. Any number, pattern or shape of resonance holes may be utilized. In each instance the empirical tuning process is the same as described above. As shown in FIG. 5, the driver circuit 18 may be placed inside the resonant chamber without undue interference with horn output.

Figure 6:
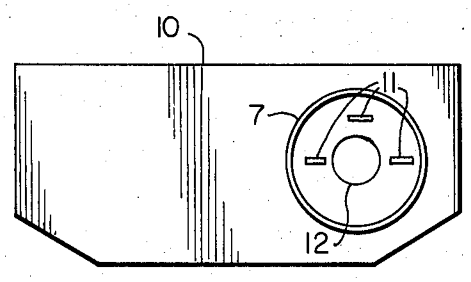
FIG. 6 is a cross-sectional view of the assembled horn of FIG. 2 taken along the section line 6'—6'.
Figure 9:
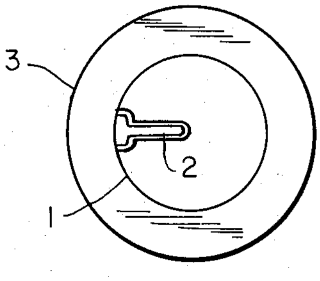
FIG. 9 is a top plan view of the tone transducer used in the invention.

FIG. 6 is included to show a top plan view of the single resonant hole 12 and the spring contacts 11 discussed in FIG. 2.

Figure 7:
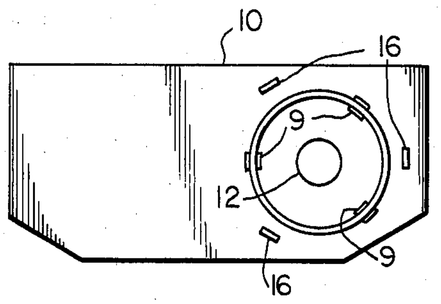
FIG. 7 is a cross-sectional view of the assembled horn of FIG. 3 taken along the section line 7'—7'.

FIG. 7 presents a top plan view of the printed circuit board 10 of FIG. 3 showing the horn ring 7 snapped into place and the slots 16 for receiving the horn clamp 13.

Figure 8:
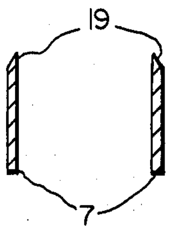
FIG. 8 is a side cross-sectional view of the horn ring of FIGS. 1–7.

FIG. 8 is a side cross-sectional view of a preferred horn ring 7 with a knife edge 19.

To further increase the audio efficiency after the tuning described above it has been found that an hermetic seal around the transducer-horn ring interface and horn ring-pc board interface increases audio efficiency by as much as a factor of two. This tight air seal can be accomplished by bonding agents such as RTV or simply by a lacquer coating. By tuning as described above and hermetically sealing the contact areas, audio outputs of 92 db at 10 feet have been accomplished at a resonant frequency of 2100 hertz for a total electrical power requirement of 0.075 watts inclusive of the power consumed by the driver circuit of FIG. 14. Typically, 90 db can be accomplished.

IONIZATION CHAMBERS

The present invention utilizes two ionization chambers 20 and 21 (FIG. 10) each containing a radiation source 23 such as Americium 241 to sense the presence of smoke in the surrounding environment. One chamber is used solely to obtain a reference current to be compared to the current observed in the test chamber. When these currents differ by more than a predetermined amount the horn driver circuit (discussed below) is activated.

The test chamber 21 is completely open to the atmosphere through an open air passage 24 to allow free infiltration of smoke particles. The reference chamber 20 on the other hand is open only through a breather tube 22 having a defined length to diameter ratio. This tube is designed to permit rapid equalization of humidity and pressure between the interior of the reference chamber and the ambient atmosphere while preventing smoke particles from entering the reference chamber.

This equilization is desirable because a difference in humidity or pressure between the reference and test chambers would lead to a difference in the currents detected which may result in activation of the horn when no smoke is present.

Humidity and pressure changes in a home environment often occur in very short time intervals owing, for example, to steam from showers or pressure from air conditioner and heating systems. The rapid changes in the atmosphere surrounding the detector require the breather tube to instantly respond to allow equalization with the interior of the reference chamber. These fluctuations have time constants (a measure of time required for the change to occur) of the order of seconds, whereas slow smoldering fires can have time constants of the order of four to eight hours. The breather tube 22 must be sized (length and internal diameter) to allow rapid humidity and pressure changes and yet not allow a significant amount of smoke to diffuse into the reference chamber within the smoldering period.

Smoke particles are typically 500 hundred times the diameter of air or water molecules. The diffusion rate is inversly proportional to the square of the particle size. A tube of diameter 0.02 inches and one inch long (i.e., a length to diameter ratio of 50:1) is found to have a time constant for pressure changes and water vapor diffusion of about one second, thus the diffusion rate for typical smoke particles is much larger by as much as 250,000 times, which is more than adequate even for very slow smoldering fires. Any breather tube having a length to diameter ratio of about 5:1 to 1000:1, preferably 20:1 to 200:1, may be used. The shape of the tube cross-section is immaterial to the successful function of the breather tube.

An alternate means for restricting the flow of smoke particles into the reference chamber while allowing the passage of gases is a filter interposed between the interior of the reference chamber and the ambient atmosphere, as, for example, a filter paper between the base of the reference chamber 20 and pc board 10.

CIRCUIT TEST

The circuit test feature of the invention is designed to allow convenient and inexpensive means for testing the unit without having to locate and press a small button or lever on the detector which is often mounted on the ceiling and out of a person's normal reach. All that is required to activate the test circuit on the invention is to press the cover of the smoke detector. This can easily be accomplished by use of a long handled object such as a broom.

Figure 10:
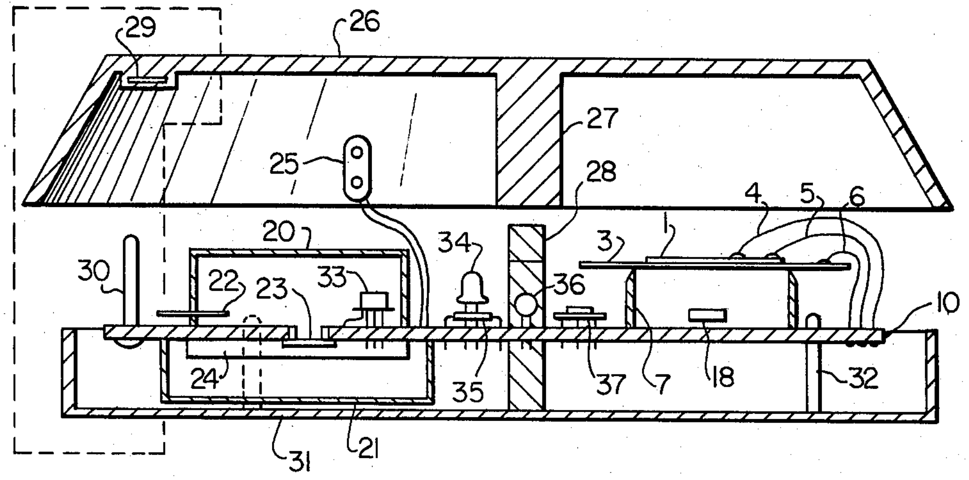
FIG. 10 is a side elevation view of the detector of the invention.

FIG. 10 shows a pivot pin 28 which inserts into cover receptacle 27 providing the pivot point of the cover 26. When the cover 26 is pivoted to one side, contact tab 29 engages test pins 30 and completes the test circuit. An audible response results if all circuits are functioning properly (see FIG. 13).

Figure 11:
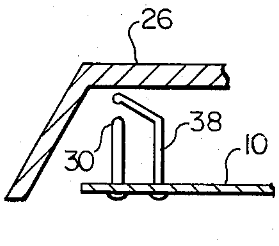
FIG. 11 is a breakaway side view of the tester switch of FIG. 10 rotated 90°.
Figure 12:
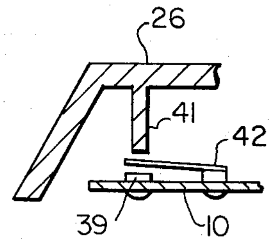
FIG. 12 is a breakaway side view of a second embodiment of the tester switch of FIG. 11.
Figure 13:
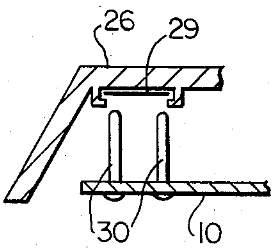
FIG. 13 is a breakaway side view of a third embodiment of the tester switch of FIG. 11.

Alternate means for closing the test switch of FIG. 13 are presented in FIGS. 11 and 12. The embodiment detailed in FIG. 11 comprises a spring contact 38 which is forced onto a pin 30 by the pivot motion of the cover 26. FIG. 12 presents still another embodiment wherein a post 41 is depressed onto spring 42 which is deflected so as to contact the rivet 39 and complete the test circuit.

HORN DRIVER CIRCUIT

Figure 14:
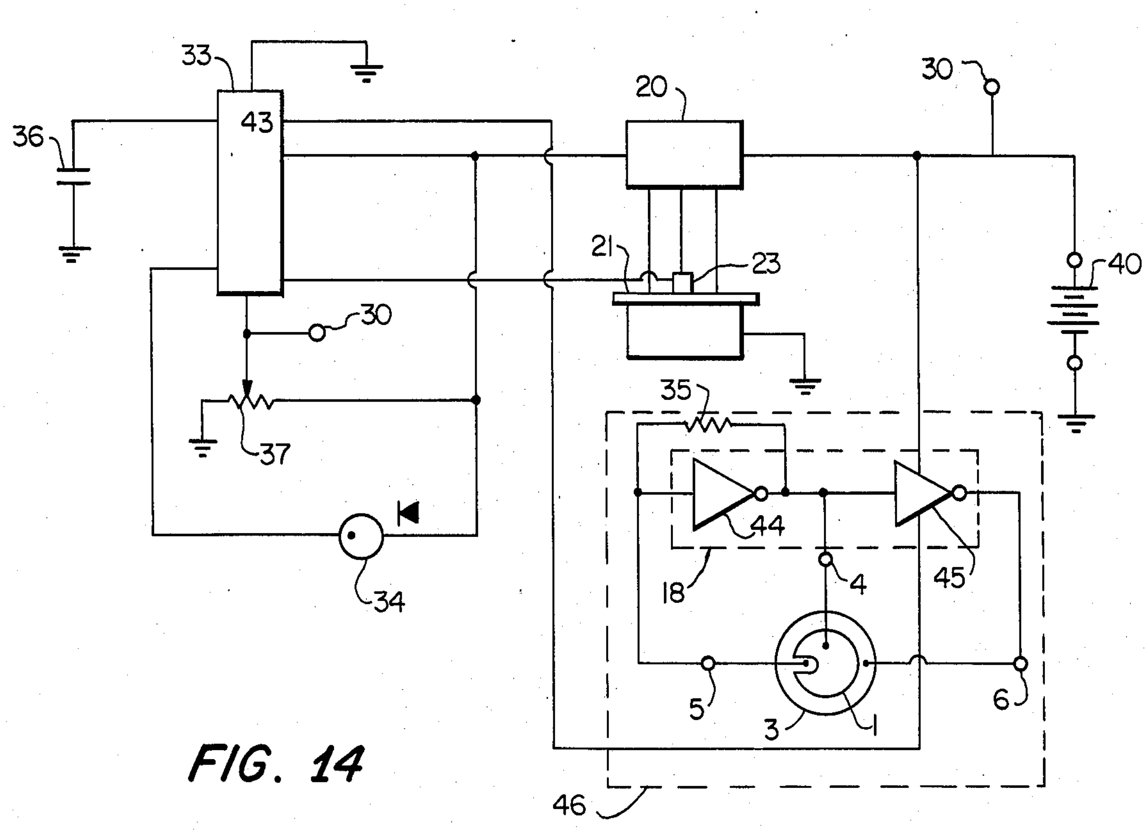
FIG. 14 is a schematic diagram of the circuitry of the invention.

Referring to FIG. 14, pin 43 of integrated circuit 33 switches to ground which starts oscillator 18 and causes voltage to be applied across wires 4 and 6 by means of amplifiers 44 and 45. This voltage causes a deformation in the brass disk 3 owing to the piezo effect of the ceramic 1. A voltage across wires 4 and 5 is generated owing to the deformation of ceramic 2. This voltage is used as a feedback means to stabilize the oscillation frequency of the oscillator 18 comprising the two amplifiers 44 and 45, a resistor 35 and the capacitance of the tone transducer.

Figure 15:
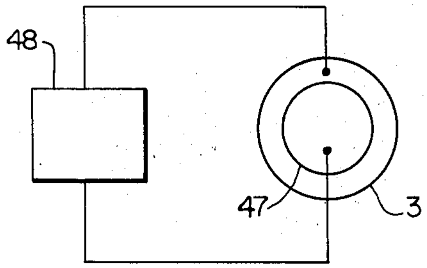
FIG. 15 is a second embodiment of the horn driver circuit 46 of FIG. 14.

An alternate embodiment of driver circuit 46 is shown in FIG. 15. This circuit comprises a continuous ceramic disk 47 bonded to brass disk 3. The tone transducer is then driven by a frequency stabilized oscillator 48 which is tuned to the lowest resonant frequency of the horn assembly (typically 2000 hertz for a disk diameter of 1.625 inches).

The above description of various embodiments of the invention are presented for purposes of illustration and are not to be construed as limiting. Various modifications or changes in these embodiments can be made without departing from the spirit or scope of the invention.

What is claimed is:

1. A smoke detector comprising two ionization chambers, a first ionization chamber essentially completely open to the ambient atmosphere and a second partially closed ionization chamber having at least one means for restricting the passage of smoke particles into the chamber while allowing rapid equilibration of atmospheric pressure and humidity, said means comprising a breather tube having a length to diameter ratio of from about 5:1 to about 1000:1.

2. The smoke detector of claim 1, wherein the breather tube has a length to diameter ratio of from about 20:1 to about 300:1.

3. The smoke detector of claim 2, wherein the breather tube has a length of 1 inch and a diameter of 0.02 inches.

4. A smoke detector, comprising: a radioactive source enclosed in an ionization chamber wherein a voltage change is produced in response to the presence of smoke particles and wherein the voltage change activates a piezoelectric horn of the detector, the piezoelectric horn comprising a power source connected to an oscillator circuit and a tone transducer, wherein the tone transducer forms a surface of at least one resonant chamber having at least one air passage opposite the transducer and wherein the tone transducer is attached to the resonant chamber at the nodal circle of the transducer.

5. The smoke detector of claim 4, wherein the tone transducer comprises a piezo ceramic bonded to a metal disk and the ceramic is exterior to the resonant chamber.

6. The smoke detector of claim 6, wherein the tone transducer comprises a piezo ceramic bonded to a metal disk and the ceramic is interior to the resonant chamber.

7. The smoke detector of claim 6, further comprising a means for contacting the ceramic.

8. The smoke detector of claim 4, wherein the tone transducer comprises an oscillator ceramic and a feedback ceramic.

9. The smoke detector of claim 4, wherein the oscillator is a frequency stable oscillator and the transducer comprises one piezo ceramic bonded to a metal disk.

10. The smoke detector of claim 4, wherein the resonant chamber is formed by a cylindrical ring having the tone transducer contacting one end of the ring and a second surface having at least one aperture aligned opposite to the transducer contacting the other end of the ring.

11. The smoke detector of claim 10, wherein the end of the cylindrical ring contacting transducer has a knife edge.

12. The smoke detector of claim 10, wherein the second surface is a printed circuit board.

13. The smoke detector of claim 12, further comprising a means for securing the transducer and ring to the circuit board.

14. The smoke detector of claim 10, wherein the transducer and the second surface are hermetically sealed to the ring.

* * * * *

4282520 U 4 007
DUBOSE / BOX 711
ACCESSION # 27-46
JEANETTE GATLING
2 STAPLES AT BOTTOM
0310000 ZIP: 557-1080
SEND TO MAILROOM
03/09 TL
X990